United States Patent [19]

Binsack et al.

[11] 4,292,233

[45] Sep. 29, 1981

[54] HIGH-IMPACT POLYBUTYLENE TEREPHTHALATE

[75] Inventors: Rudolf Binsack, Krefeld; Dieter Rempel, Leverkusen; Gert Humme, Odenthal; Karl-Heinz Ott, Leverkusen, all of Fed. Rep. of Germany

[73] Assignee: Bayer Aktiengesellschaft, Fed. Rep. of Germany

[21] Appl. No.: 165,259

[22] Filed: Jul. 2, 1980

[30] Foreign Application Priority Data

Jul. 7, 1979 [DE] Fed. Rep. of Germany ....... 2927576

[51] Int. Cl.$^3$ ............................................. C08L 67/00
[52] U.S. Cl. .................................. 260/40 R; 525/69; 525/316
[58] Field of Search ................. 525/69, 316; 260/40 R

[56] References Cited

U.S. PATENT DOCUMENTS 3,919,353 11/1975 Castelnuovo et al. ................ 525/69
4,080,354 3/1978 Kramer ............................. 260/40 R Primary Examiner—J. Ziegler
Attorney, Agent, or Firm—Connolly and Hutz

[57] ABSTRACT

The toughness of polybutylene terephthalate can be considerably improved by the addition of an ABS-graft copolymer having a relatively high content of graft base and a closely defined particle size; the typical properties of polybutylene terephthalate, such as its high dimensional heat stability, hardness and rigidity, are not substantially reduced. The products show an excellent multiaxial impact strength.

10 Claims, No Drawings

HIGH-IMPACT POLYBUTYLENE TEREPHTHALATE

This invention relates to high-impact mixtures of polybutylene terephthalate and ABS-graft polymer having a certain composition and a closely defined particle size.

Polybutylene terephthalates have acquired considerable significance in the field of thermoplastic moulding compositions by virtue of their valuable technological properties, such as for example rigidity, hardness, abrasion resistance, stability under dynamic and thermal stressing, and rapid processibility. However, one disadvantage of these moulding compositions is that their multiaxial (two-dimensional) impact strength is not always adequate.

Numerous proposals have been put forward with a view to increasing the toughness of thermoplastic polyesters by the addition of co-condensation of other polymers, particularly those based on modified elastomers and polyolefins (German Offenlegungsschrifts Nos. 1,694,173 and 1,928,369; German Auslegeschrifts Nos. 1,961,226 and 1,962,855; German Offenlegungsschrifts Nos. 2,248,242, 2,310,034, 2,357,406 and 2,364,318 and U.S. Pat. Nos. 3,236,914 and 3,723,574). However, the proposed measures are attended by the disadvantage that the improvement in toughness is accompanied by a significant deterioration in other properties, for example the properties mentioned above. In addition, the multiaxial impact strength does not reach the required level.

Attempts have also been made to increase the toughness of polybutylene terephthalates by additions of, in particular, acrylontrile/butadiene/styrene (ABS)-graft polymers (German Offenlegungsschrifts Nos. 2,035,390 and 2,348,377; Japanese Patent Applications Nos. 127,689=49-097 081, 074,743=50-023 448 and 074,744=50-023, 449. In this case, however, either the typical properties of the polybutylene terephthalate, such as its high dimensional stability under heat, hardness and rigidity, are excessively reduced or products are obtained which show inadequate multiaxial impact strength.

It has now surprisingly been found that the disadvantages referred to above may be obviated by selecting certain ABS-graft polymers, i.e. those having a relatively high content of graft base and a closely defined particle size.

The present invention provides mixtures comprising

A. from 65 to 99% by weight, preferably from 70 to 98% by weight and, more particularly, from 75 to 97% by weight of polybutylene terephthalate, and B. from 1 to 35% by weight, preferably from 2 to 30% by weight and, more particularly, from 3 to 25% by weight of ABS-graft polymer, the above percentages being based on the sum of A+B and the graft polymer B being obtainable by grafting I. from 10 to 40% by weight, preferably from 10 to 35% by weight and, more particularly, from 15 to 25% by weight, based on B, of a mixture of
 (a) from 10 to 35% by weight and preferably from 20 to 35% by weight, based on the sum of a+b, of acrylonitrile and
 (b) from 65 to 90% by weight and preferably from 65 to 80% by weight, based on the sum of a+b, of styrene onto II. from 60 to 90% by weight, preferably from 65 to 90% by weight and, more particularly, from 75 to 85% by weight, based on B, of a cross-linked butadiene polymer containing at least 70% by weight, based on II, of butadiene residues as graft base, characterised in that the gel content of the graft base II amounts to at least 70 and preferably to at least 80% (as measured in toluene), the degree of grafting G is from 0.15 to 0.55 and the average particle diameter $d_{50}$ of the ABS-graft polymer B is from 0.2 to 0.6, preferably from 0.3 to 0.5 and, more particularly, approximately 0.4 μm.

The polybutylene terephthalates A contain at least 90 mole percent, based on the dicarboxylic acid component, of terephthalic acid residues and at least 90 mole percent, based on the diol component, of 1,4-butane diol residues.

In addition to terephthalic acid residues, the polybutylene terephthalates A may contain up to 10 mole percent of residues of other aromatic, aliphatic or cycloaliphatic dicarboxylic acids, for example succinic acid, adipic acid or isophthalic acid residues. In addition to butane diol residues, they may contain up to 10 mole percent of residues of another diol which may correspond to the following formula:

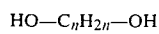

$$HO-C_nH_{2n}-OH$$

in which n is an integer of from 2 to 10. More particularly, up to 10 mole percent of alkyl-substituted diols, such as neopentyl glycol, 2,2,4-trimethyl-1,6-hexane diol, 2-ethyl-1,3-propane diol, 2,2,4-trimethyl-1,3-pentane diol, 2-methyl-2,4-pentane diol, 3-methyl-2,4-pentane diol or 2-ethyl-1,3-hexane diol may also be incorporated (German Offenlegungsschrifts Nos. 2,407,674; 2,407,776 and 2,715,932).

The polybutylene terephthalates A may also be branched by compounds having a branching effect, such as polycarboxylic acids or polyols (German Auslegeschrift No. 1,900,270).

The polybutylene terephthalates used as component A have an intrinsic viscosity of generally from 0.7 to 1.5 dl/g, preferably from 0.8 to 1.3 dl/g and, more particularly, from 0.8 to 1.05 dl/g, as measured in phenol/o-dichlorobenzene (1:1 parts by weight).

In addition to butadiene residues, the graft base II may contain up to 30% by weight, based on II, of residues of other α,β-ethylenically unsaturated monomers such as, for example, styrene, acrylonitrile or esters of acrylic or methacrylic acid containing from 1 to 4 carbon atoms in the alcohol component (such as methyl acrylate, ethyl acrylate, methyl methacrylate or ethyl methacrylate). The preferred graft base II consists of pure polybutadiene.

Since, as already known, the graft monomers I are not completely grafted onto the graft base II during the grafting reaction, graft polymers in the context of the invention are also understood to include products of the type which, in addition to the actual graft polymers, also contain homopolymers and copolymers of the graft monomers I used. The degree of grafting G designates the weight ratio of grafted styrene/acrylonitrile to graft base and has no dimension.

The average particle diameter $d_{50}$ is the diameter above which 50% by weight and below which the other 50% by weight of the particles lie.

The average particle diameter may be determined by ultracentrifuge measurements (W. Scholtan, H. Lange, Kolloid Z. and Z. Polymere 250 (1972), 782–796) or by electron microscopy and subsequent counting of the particles (G. Kämpf, H. Schuster, Angew. Makromolekulare Chemie 14 (1970), 111–129).

The graft polymers B may be produced by methods known per se, for example by emulsion polymerisation or latex suspension processes using radical-forming polymerisation initiators in a polybutadiene or butadiene-copolymer latex.

The processes for producing ABS-graft polymers are known.

The mixture according to the invention may be prepared in the usual mixing units, such as mixing rolls, kneaders, single-screw and multi-screw extruders. Twin-screw extruders are particularly suitable.

The mixtures may be prepared in the above-mentioned mixing units by melting and homogenising the two components A and B together or by incorporating the graft polymer B into the melt of the polybutylene terephthalate A.

The temperature at which the mixtures are prepared should be at least 10° C. above the melting point of polybutylene terephthalate A and below 300° C., preferably in the range of from 245° to 270° C.

The mixtures according to the invention may contain the usual additives, such as lubricants and mould-release agents, nucleating agents, stabilisers, fillers and reinforcing materials, flameproofing additives and dyes. The additives are preferably added during compounding either in pure form or in the form of concentrates.

The mixtures according to the invention are distinguished by a significant improvement in multi-axial impact strength for low contents of graft polymer B. Another surprising property of the mixtures is their high flow seam strength. In addition, the mixtures are distinguished by high dimensional stability under heat.

Commensurate with their property spectrum, the mixtures according to the invention may therefore be used anywhere in the injection-moulding and extrusion field where high dimensional stability under heat and high toughness are required, for example in temperature-stressed domestic appliances, bodywork sections or office machine components.

The parts quoted in the following Examples are parts by weight.

EXAMPLES 1 to 8

Polybutylene terephthalates having an intrinsic viscosity of 0.95 dl/g was melted in a continuous twin-screw extruder (Werner and Pfleiderer type ZSK 32). The ABS-graft polymer was introduced into the PBT melt through a second inlet pipe, preferably in a nitrogen atmosphere. The graft polymer was melted and homogeneously distributed in the polybutylene terephthalate. It can be advantageous to degas the melt before it leaves the die. The barrel temperatures were adjusted in such a way that a melt temperature of 255° C. was guaranteed. The melt strand of the mixture of polybutylene terephthalate and graft polymer was cooled in water, granulated and dried.

To produce the graft polymer, the quantities indicated in the Table of acrylonitrile and styrene were grafted by the emulsion polymerisation process according to German Auslegeschrifts Nos. 1,247,665 and 1,269,360 onto 65 to 80 parts of a coarsely particulate cross-linked polybutadiene rubber with an average particle diameter $d_{50}$ of the polybutadiene graft base present in latex form of 0.4 μm and a gel content of 85%.

Standard small test bars (corresponding to DIN 53 453) and plates measuring 3×60×60 mm were injection-moulded from the granulate at 260° C. in a standard injection-moulding machine.

The test specimens thus produced were tested for impact strength and notched impact strength (in accordance with DIN 53 453), ball indentation hardness (in accordance with DIN 53 456), dimensional stability under heat according to Vicat (in accordance with DIN 53 460) and for multiaxial impact strength by the EKWA-test (DIN 53 443, Sheet 2, penetration of a plate measuring 3×60×60 mm by a 35 kg weight with a conically tipped penetration spike (diameter 20 mm) dropped from a height of 1 meter). The flow seam strength was determined by the tensile test (according to DIN 53 455) using tension bars injected at both ends.

TABLE

| Examples | Proportion of graft polymer in the PBT mixture % | Proportion of polybutadiene in the graft polymer % | Proportion in the graft shell of acylonitrile % | styrene % | G | Notched impact strength kJ/m² | Ball indentation hardness MPa | Dimensional stability under heat °C. | EKWA-test No. of ruptures % |
|---|---|---|---|---|---|---|---|---|---|
| 1 | 3 | 65 | 28 | 72 | 0.35 | 4.5 | 114 | 174 | 100 |
| 2 | 10 | 65 | 28 | 72 | 0.35 | 5.0 | 109 | 166 | 100 |
| 3 | 20 | 65 | 28 | 72 | 0.35 | 8.8 | 88 | 134 | 100 |
| 4 | 30 | 65 | 28 | 72 | 0.35 | 16.3 | 72 | 117 | 100 |
| 5 | 10 | 80 | 28 | 72 | 0.20 | 5.6 | 95 | 165 | 100 |
| 6 | 20 | 80 | 28 | 72 | 0.20 | 28 | 78 | 142 | 100 |
| 7 | 30 | 80 | 28 | 72 | 0.20 | 38 | 60 | 113 | 100 |
| 8 | 10 | 80 | 12 | 88 | 0.21 | 7.0 | 100 | 168 | 100 |
| PBT (comparison) | — | — | — | — | | 3.5 | 115 | 175 | 40 |

The impact strength test produced the result "unbroken" for the test specimens of all the Examples
The flow seam strength * for all the test specimens amounted to 100%.
Abbreviation: EKWA = electronic force/travel recording
*Tensile strength with flow seam × 100 / Tensile strength without flow seam

EXAMPLE 9

A polybutylene terephthalate having an intrinsic viscosity of 1.15 dl/g was used instead of the polybutylene terephthalate of Examples 1 to 8 having an intrinsic viscosity of 0.95 dl/g. In addition, the product was coloured grey with pigments. The mixture was prepared in a kneader under the same conditions as in the twin-screw extruder.

TABLE
(for Example 9)

| Example | Proportion of graft polymer in the PBT mixture % | Proportion of polybutadiene in the graft polymer % | Proportion in the graft shell acrylonitrile % | Proportion in the graft shell styrene % | G | Impact strength kJ/m² |
|---|---|---|---|---|---|---|
| 9 | 15 | 80 | 28 | 72 | 0.20 | ub.[1] |
| PBT (comparison) | — | — | — | — |  | ub. |

| Example | Notched impact strength kJ/m² | Ball indentation hardness MPa | Dimensional stability under heat Vicat B °C. | EKWA-test number of ruptures % |
|---|---|---|---|---|
| 9 | 21 | 88 | 157 | 100 |
| PBT (comparison) | 3.7 | 114 | 175 | 50 |

[1] unbroken

We claim:

1. Mixtures of
   A. from 65 to 99% by weight of polybutylene terephthalate, and
   B. from 1 to 35% by weight of ABS graft polymer, the above percentages being based on the sum of A+B and the graft polymer B being obtainable by grafting
   I. from 10 to 40% by weight, based on B, of a mixture of
      (a) from 10 to 35% by weight, based on the sum of a+b, of acrylonitrile, and
      (b) from 65 to 90% by weight, based on the sum of a+b, of styrene onto
   II. from 60 to 90% by weight, based on B, of crosslinked butadiene polymer containing at least 70% by weight, based on II, of butadiene residues as the graft base, characterised in that the gel content of graft base II amounts to at least 70% (as measured in toluene), the degree of grafting G is from 0.15 to 0.55 and the average particle diameter $d_{50}$ of the ABS graft polymer B is from 0.2 to 0.6 μm.

2. Mixtures as claimed in claim 1, characterised in that the mixtures consist of from 70 to 98% by weight of A and from 2 to 30% by weight of B.

3. Mixtures as claimed in claim 1, characterised in that the mixtures consist of from 75 to 97% by weight of A and from 3 to 25% by weight of B.

4. Mixtures as claimed in claim 1, characterised in that the graft polymer B is obtainable by grafting from 10 to 35% by weight of I onto from 65 to 90% by weight of II.

5. Mixtures as claimed in claim 1, characterised in that the graft polymer B is obtainable by grafting from 15 to 25% by weight of I onto from 75 to 85% by weight of II.

6. Mixtures as claimed in claim 1, characterised in that from 20 to 35% by weight of the graft monomers I consist of acrylonitrile and from 65 to 80% by weight of styrene.

7. Mixtures as claimed in claim 1, characterised in that the gel content of the graft base II amounts to at least 80% (as measured in toluene).

8. Mixtures as claimed in claim 1, characterised in that the graft polymer B has an average particle diameter $d_{50}$ of from 0.3 to 0.5 μm.

9. Mixtures as claimed in claim 1, characterised in that the graft polymer B has an average particle diameter $d_{50}$ of approximaely 0.4 μm.

10. Mixtures as claimed in claim 1, characterised in that they contain 5 to 50% by weight of glass fibers, based on the sum of A+B+glass fibers.

* * * * *